(12) United States Patent
Dubaele et al.

(10) Patent No.: US 12,515,381 B2
(45) Date of Patent: Jan. 6, 2026

(54) OVEN PROVIDED WITH A MEASUREMENT SYSTEM INSIDE THE FIBROUS MAT

(71) Applicant: SAINT-GOBAIN ISOVER, Courbevoie (FR)

(72) Inventors: Brice Dubaele, Avrechy (FR); Jonathan Bauchard, Villers-Saint-Paul (FR); Christian Metrope, Lafraye (FR); Pierrick Guyot, Montrouge (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 452 days.

(21) Appl. No.: 18/018,551

(22) PCT Filed: Jul. 27, 2021

(86) PCT No.: PCT/FR2021/051399
§ 371 (c)(1),
(2) Date: Jan. 28, 2023

(87) PCT Pub. No.: WO2022/023662
PCT Pub. Date: Feb. 3, 2022

(65) Prior Publication Data
US 2023/0294336 A1    Sep. 21, 2023

(30) Foreign Application Priority Data

Jul. 29, 2020 (FR) .................................. 2008019

(51) Int. Cl.
*B29C 35/02* (2006.01)
*B29C 35/00* (2006.01)
(Continued)

(52) U.S. Cl.
CPC ............ *B29C 35/02* (2013.01); *B29C 35/002* (2013.01); *B29C 67/249* (2013.01); *B65G 15/22* (2013.01);
(Continued)

(58) Field of Classification Search
CPC ..... B29C 35/02; B29C 35/002; B29C 67/249; B29C 2037/90; B65G 15/22;
(Continued)

(56) References Cited

U.S. PATENT DOCUMENTS

2014/0158497 A1* 6/2014 Bogle ................... B65G 43/08
                                                198/341.07
2018/0003693 A1* 1/2018 Pelini ................... B29C 67/249

FOREIGN PATENT DOCUMENTS

WO   WO 2006/017106 A2   2/2006
WO   WO 2009/080938 A2   7/2009
(Continued)

OTHER PUBLICATIONS

International Search Report as issued in International Patent Application No. PCT/FR2021/051399, dated Nov. 18, 2021.

*Primary Examiner* — Michael G Hoang
*Assistant Examiner* — Kurt Wolford
(74) *Attorney, Agent, or Firm* — Pillsbury Winthrop Shaw Pittman LLP

(57) ABSTRACT

An oven for heating a fibrous mat includes a first conveyor for conveying the mat in a forward direction, and a measurement system inside the mat, including a sensor mounted on the first conveyor and adapted to move, in a transverse direction of the mat, between a first retracted position inside the conveyor and a measurement position inside the mat under the effect of an activation system, the measurement system being such that the sensor is connected by a mechanical transmission system to a finger projecting on a lateral side of the first conveyor, and the activation system includes at least one contact surface located facing the lateral side of the conveyor and adapted to engage with the finger, when it moves in the forward direction in order to move the sensor (Continued)

from its retracted position to its measurement position by the mechanical transmission system.

20 Claims, 4 Drawing Sheets

(51) Int. Cl.
*B29C 37/00* (2006.01)
*B29C 67/24* (2006.01)
*B65G 15/22* (2006.01)
*D04H 1/4226* (2012.01)
*F26B 13/10* (2006.01)

(52) U.S. Cl.
CPC ....... *D04H 1/4226* (2013.01); *B29C 2037/90* (2013.01); *B65G 2203/042* (2013.01); *B65G 2203/045* (2013.01); *F26B 13/101* (2013.01)

(58) Field of Classification Search
CPC ........ B65G 2203/042; B65G 2203/045; D04H 1/4226; F26B 13/101
See application file for complete search history.

(56) References Cited

FOREIGN PATENT DOCUMENTS

| WO | WO 2010/029266 A1 | 3/2010 |
| WO | WO 2016/108006 A1 | 7/2016 |

\* cited by examiner

[Fig. 1]
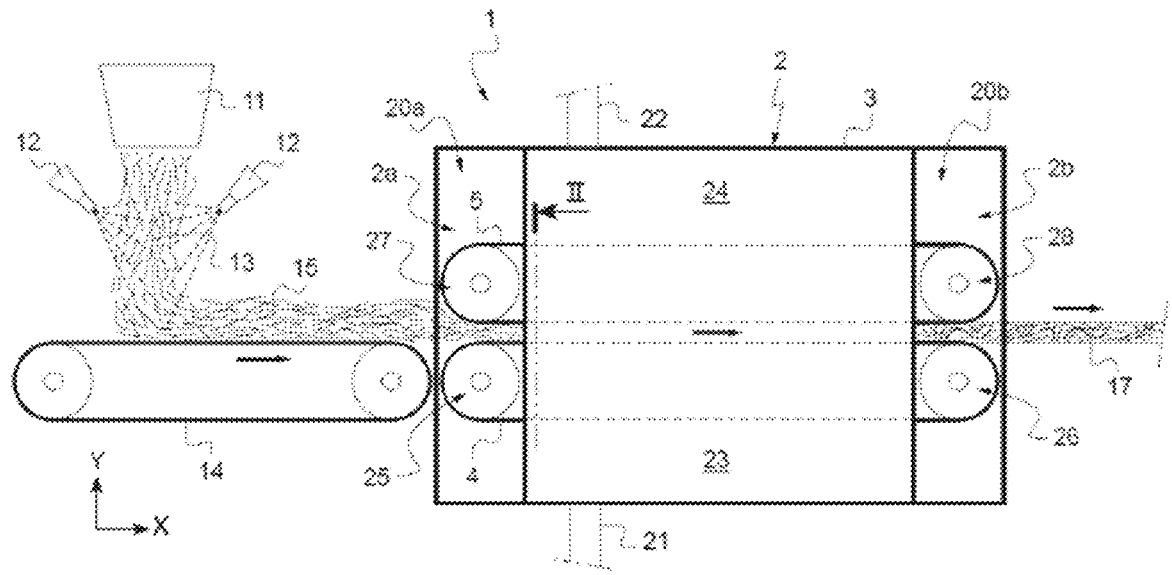
[Fig. 2]
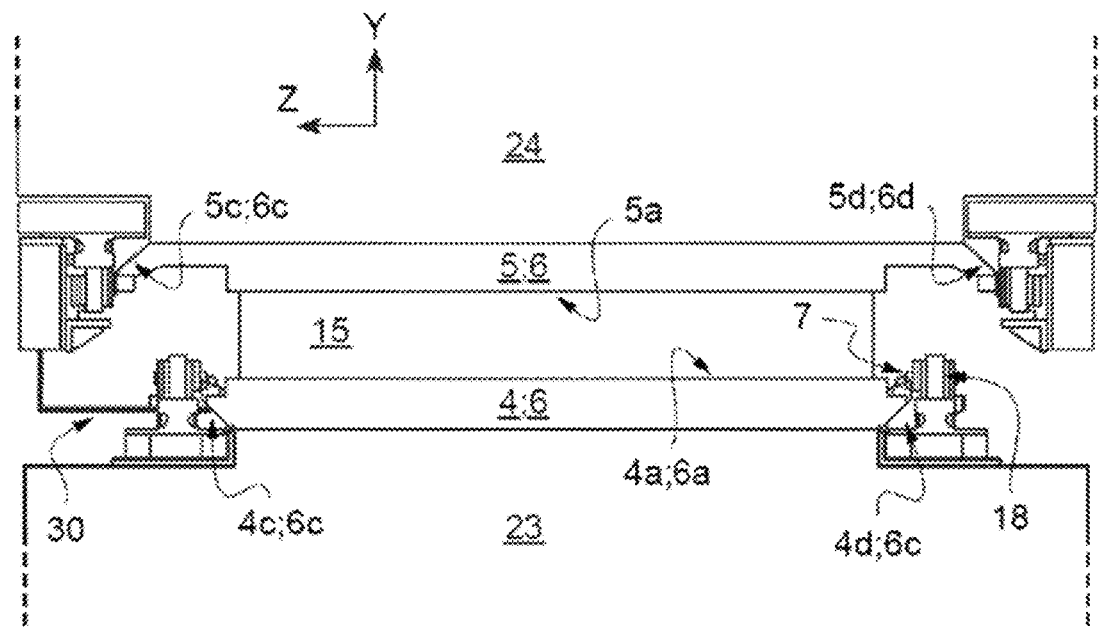

[Fig. 3]
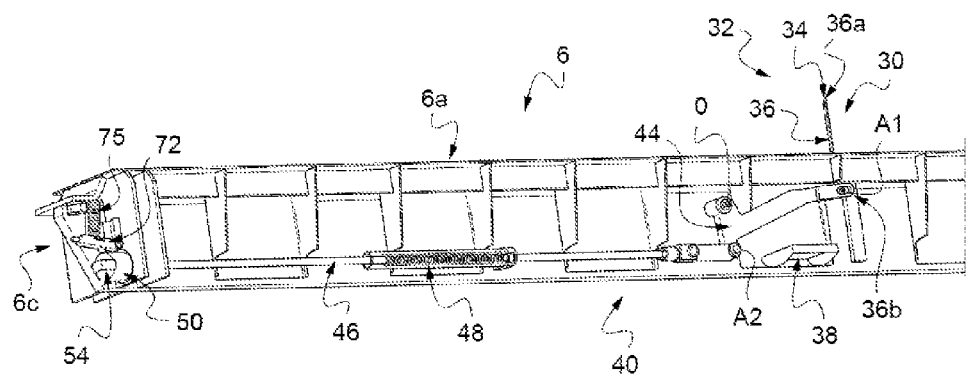
[Fig.4]
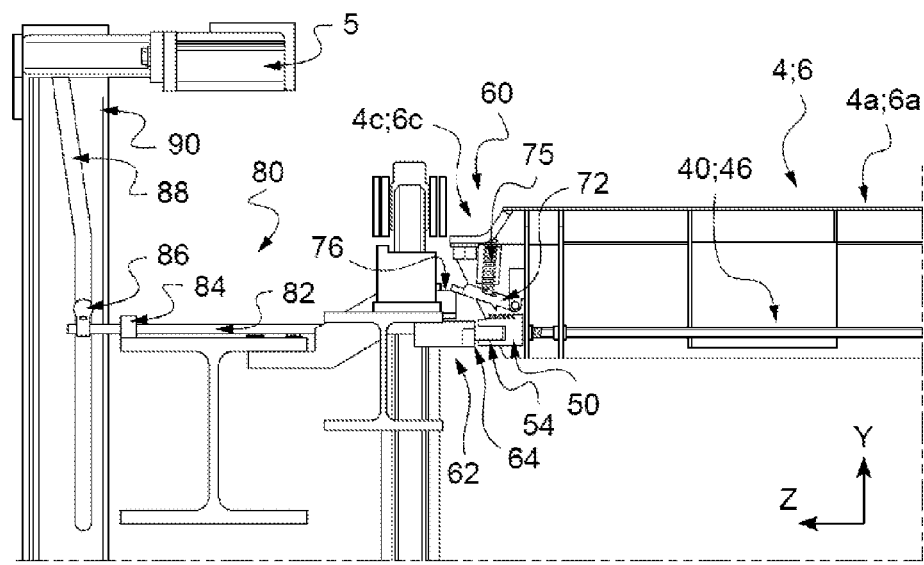

[Fig. 5]
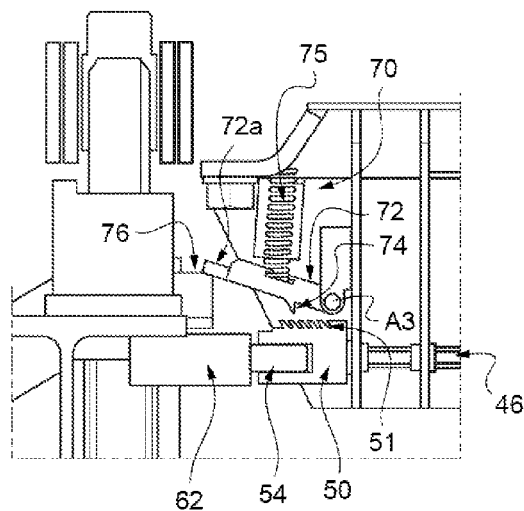
[Fig. 6]
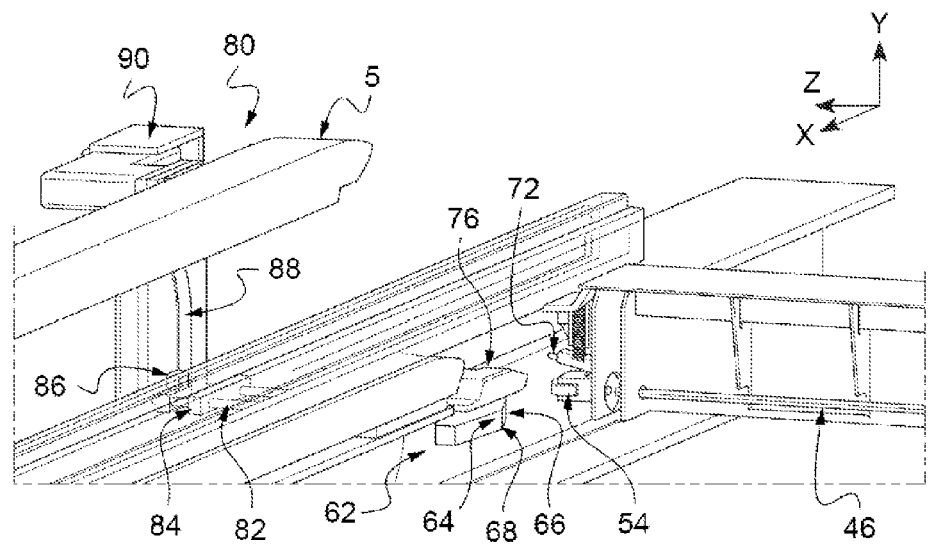

[Fig. 7]
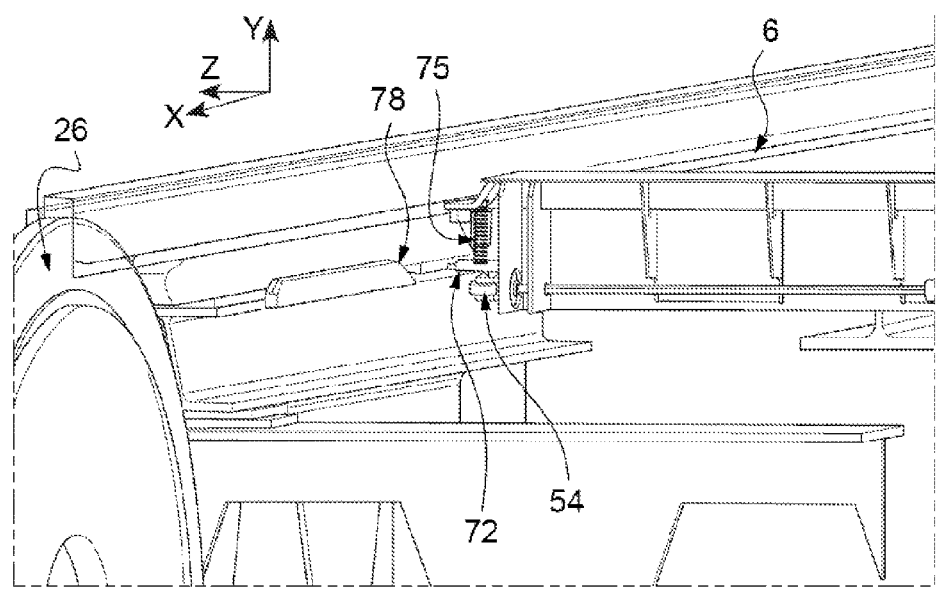

OVEN PROVIDED WITH A MEASUREMENT SYSTEM INSIDE THE FIBROUS MAT

CROSS-REFERENCE TO RELATED APPLICATIONS

This application is the U.S. National Stage of PCT/FR2021/051399, filed Jul. 27, 2021, which in turn claims priority to French patent application number 2008019 filed Jul. 29, 2020. The content of these applications are incorporated herein by reference in their entireties.

The invention relates to the field of fibrous mats, in particular mats comprising mineral or plant fibers bound by a binder. These mats are intended to be cut in order to form, for example, thermal and/or acoustic insulation panels or rolls.

The manufacture of such fiber mats primarily comprises fiberizing and depositing fibers on a perforated moving conveyor or transporter. The fibers are pressed onto the conveyor using suction boxes arranged under the transporter on which the fibers are deposited. During fiberizing, a binder is sprayed onto the fibers, this binder having adhesive properties and usually comprising a hot-curable material, such as a thermosetting resin.

The primary layer of relatively loose fibers on the collecting conveyor is then transferred to a heating device commonly called a crosslinking oven in the field in question. The fiber mat passes through the oven over its entire length, thanks to additional conveyors. These are frequently two endless belts facing each other and spaced apart by a distance adjusted to determine the thickness of the mat that is formed. Furthermore, each belt of the conveyors is made up of pallets forming articulated screens which are perforated so as to be permeable to air and other gases resulting from the heating of the mat. Such a mat thus has a greater or lesser density depending on the degree of compression exerted by the two conveyors in the oven.

During its passage in the oven, the mat is simultaneously dried and subjected to a specific heat treatment which causes the polymerization (or "curing") of the thermosetting resin of the binder present on the surface of the fibers.

The procedure used to cause the curing of the binder consists in passing heated air into the mat in such a way that the binder present throughout the thickness of the mat is brought progressively to a temperature above its curing temperature. For this purpose, the crosslinking oven is composed of an enclosure constituting a chamber closed around the mat, wherein are arranged a series of boxes supplied with hot air coming from burners and circulated by fans. Each box thus defines an independent heating zone, wherein specific heating conditions are set. The boxes are separated by walls having openings for the mat and the upper and lower conveyors. The use of a plurality of boxes thus allows a graduated elevation of the temperature of the mat throughout its passage through the oven and prevents the appearance of hot spots due to locally excessive heating or alternatively the presence within the mat of zones wherein the binder would not have been entirely polymerized. An oven used in the mineral wool manufacturing process thus very commonly comprises a multitude of boxes (for example between 3 and 10), as well as known means making it possible to establish variable thermal conditions within each box.

At the present time, the use of new alternative binders, instead of formo phenolic resins, makes it more difficult to control the conditions of the method for curing the mat of fibers in a conventional oven as described above. Such binders, generally devoid of formaldehyde, sometimes described as "green binders", in particular when they are at least partially derived from a base of renewable raw material, in particular plant, in particular of the type based on hydrogenated or non-hydrogenated sugars, for example as described in applications WO 2009/080938 and WO 2010/029266, most often require very good regulation of the curing temperatures in order to reach the thermoset state, the curing temperature range being narrower. Most particularly, the binder must be subjected to a temperature between a minimum in order to complete its hardening and a maximum beyond which it degrades rapidly, which ultimately results in degraded mechanical properties of the final product, even after its installation. The difference between the minimum and the maximum, depending on the type of green binder, may be of the order of only 20° C., or even less. Controlling the temperature in the mat of fibers therefore requires new techniques and in particular changes in the very design of the ovens.

A measurement method inside a fibrous mat has already been described in the applicant's application WO 2016108006, but there is still a need for a system that is less complex and more resistant to the hot environment and dusts from the ovens.

One aim of the invention is to provide an oven comprising a system for precise measurement of the characteristics of the mat during its curing, and which is resistant over time.

For this purpose, an object of the invention is an oven for heating a fibrous mat, in particular a mat comprising mineral or plant fibers bound by a binder, said oven comprising at least a first conveyor for transporting the mat in a forward direction, and a measurement system inside the mat, said measurement system comprising a sensor mounted on said first conveyor and adapted to move in a transverse direction between a retracted position inside the conveyor and a measurement position inside the mat under the effect of an actuation system, the measurement system being such that the sensor is connected by a mechanical transmission system to a finger protruding from a lateral side of the first conveyor, and the actuation system comprises at least one contact surface located facing said lateral side of the conveyor and adapted to cooperate with said finger during its movement in the forward direction in order to move the sensor from its retracted position to its measurement position by means of the mechanical transmission system.

The oven according to the invention is defined by the following three directions:
- the forward direction of the mat inside the oven,
- the transverse direction, which corresponds to the direction of the thickness of the mat,
- the lateral direction, which is perpendicular to the two directions mentioned above.

It is understood that the finger, the transmission system and the sensor are mounted on the first conveyor, and integral with its movement in the forward direction. The finger is located on a lateral side of the conveyor.

The actuation system, which in particular comprises the contact surface intended to cooperate with the finger, is located at least partially on the side of the oven, facing the lateral side of the first conveyor, and secured to the frame of the oven. It is thus easily accessible and observable by the operator. In addition, the installation of the measurement system on an existing oven is facilitated.

The measurement system is thus simple, robust and durable despite the difficult conditions to which it is exposed.

The first conveyor may either be the lower conveyor or the upper conveyor of the oven.

According to one example, the mechanical transmission system is configured such that a lateral movement of the finger generates a transverse movement of the sensor. For example, the mechanical transmission system comprises a laterally extending transmission arm and a pivoting lever connected to said transmission arm and to said sensor such that a lateral movement of the transmission arm generates a transverse movement of the sensor.

For the rest of the present description, the first position of the finger is called a position of the finger wherein the sensor is in its retracted position, and the second position of the finger a position wherein the sensor is in its measurement position.

According to one example, the finger is a rotary roller. The roller rolls, so to speak, along the contact surface. It makes it possible to limit friction to facilitate movement and cooperation with the contact surface.

Inside the oven, the conveyors compress the mat to give it the desired thickness. Depending on the manufactured product, the distance between the first and the second conveyor is therefore adjustable. In particular, the height of the upper conveyor is generally set at each start of the line or during a change of product. For the measurement to be as accurate as possible, it is preferable to measure at the core of the product, i.e., preferably halfway between the first and the second conveyor. Advantageously, the measurement system comprises a system for adjusting the measurement position of the sensor as a function of the position of a second conveyor facing said first conveyor in the transverse direction. Preferably, the adjustment system is configured such that the measurement position of the sensor is such that it is positioned midway between the first and second conveyors, in the transverse direction.

According to one example, the position adjustment system comprises means for adjusting the position of the contact surface in the lateral direction, depending on the position of the second conveyor.

According to one example, the position adjustment means comprise a transmission system configured to transform a transverse movement of the second conveyor into a lateral movement of the contact surface.

According to one example, the contact surface is integral with a sliding element, mounted slidably along a rail integral to the second conveyor and the inclination of which with respect to the transverse direction and to the lateral direction is such that a transverse movement of the second conveyor causes a lateral movement of the sliding element and therefore of the contact surface.

The sliding element is for example a sliding lug inside a groove forming a rail. Or it may be a slide, adapted to slide on a rib forming a rail.

According to one example, a connecting arm, preferably guided in lateral translation, connects the contact surface to the sliding element with which it is integral.

According to one example, the finger is elastically returned to a position wherein the sensor is in its retracted position (first position), in particular biased laterally away from the first conveyor.

The contact surface is arranged at a predetermined and fixed position relative to the frame of the oven, in the forward direction. According to one example, the contact surface forms at least one deployment ramp, which allows progressive passage of the finger from its first position to its second position (reached when the finger has reached the apex of the ramp).

The ramp preferably has a length, measured in the forward direction, of between 5 and 50 cm.

According to a preferred but non-limiting arrangement, the ramp is extended by a bearing. When the finger is in contact with the bearing, the sensor is held in its measurement position.

It can be envisaged that the bearing has a rail shape for guiding the finger.

According to one example, the measurement system is configured such that the sensor is deployed in its measuring position in an abscissa called the start-of-measurement in the forward direction, and so that the sensor is returned to its retracted position in a so-called end-of-measurement abscissa in the forward direction.

The duration and frequency of measurement inside the mat may vary depending on the arrangement of the measurement system. According to one embodiment, the measurement system can be configured so that the measurement is continuous throughout the path of the mat inside the oven. According to another embodiment, the measurement system can be configured to allow several short measurements at different locations of the path.

According to one example, the actuation system is configured such that the contact between the finger and the contact surface is broken upstream from the end-of-measurement abscissa.

The contact surface can then be quite short, insofar as it only has a function of deploying the sensor but does not have a function of maintaining the sensor in the measurement position. This embodiment allows easy integration of the measurement system in existing ovens.

For example, the contact surface can have a total length, measured in the forward direction, of less than 1 meter, preferably of less than 50 cm.

In particular, when the contact surface thus has a length less than the desired measurement length, the actuation system may further comprise a system for locking the finger in lateral position, which locking system has the function of maintaining the finger in its measurement position, up to the end-of-measurement abscissa. Preferably, this position locking system is configured such that the finger, by default, is locked in its lateral position. In other words, the locking system, by default, acts to lock the finger in position.

According to one configuration, the locking system allows the locking of the finger in a plurality of predefined lateral locking positions, which may or may not be regularly spaced apart.

For example, the position locking system may comprise a rotary pawl provided with at least one stop tooth and biased by elastic return means in a locking position wherein said tooth is adapted to cooperate with complementary retaining means carried by the finger or a support element of the finger.

The rotary pawl is secured to the first conveyor.

These complementary retaining means comprise for example a plurality of retaining elements of the tooth, distributed in the lateral direction, each retaining element corresponding to a predetermined lateral locking position for the finger.

It is understood that, in a case where the actuation system comprises such a locking system, the actuation system must further comprise means for unlocking the lateral position of the finger, configured to make the engagement of the finger possible with the contact surface in particular.

For example, the actuation system comprises means for unlocking the pawl making it possible to pivot the pawl against the elastic return means, in a disengaged position wherein the tooth is disengaged from said complementary retaining means.

According to one example, the unlocking means comprise at least one first deactivation ramp arranged to cooperate with the pawl in line with the support surface, and more particularly upstream of the deployment ramp and, where appropriate, in line with at least one portion of the bearing. The finger can thus be moved from its retracted position to its measurement position. The deactivation ramp is secured to the frame of the oven. The system for locking the finger in lateral position makes it possible, when the finger leaves the bearing, for the sensor to remain in its measurement position instead of returning.

Once the measurement is carried out inside the oven, the sensor is generally retracted.

For this purpose, and in particular when the finger is returned elastically in its first position, the unlocking means can comprise a second deactivation ramp spaced from the first deactivation ramp, in the forward direction. By deactivating the locking means, the second ramp allows the finger to return to its first position, under the effect of the elastic return means. The second deactivation ramp is secured to the frame of the oven.

According to an alternative embodiment, the contact surface can comprise a bearing extending continuously to the end-of-measurement abscissa, and in particular to the vicinity of the outlet of the oven. In this case, the contact surface has functions both of deploying the sensor and of holding the sensor in its measurement position. The means of locking/unlocking the finger in position may optionally be omitted. The advantage of this arrangement is that the measurement is done exactly at the core of the mat, advantageously within a millimeter and not according to predefined locking positions such as mentioned previously in connection with the locking/unlocking means.

According to one example, at least the first conveyor is formed of a plurality of pallets consisting of screens articulated together and perforated.

According to one example, the sensor is a temperature sensor. However, this arrangement is not limiting, and the measurement system could also be a moisture measurement system, wherein the sensor would be a moisture sensor.

According to one advantageous provision, the measurement system is also connected to a control member of the curing method, adapted to optimize the curing of the product as a function of the measurement carried out by the sensor.

The following example shows the invention in a non-limiting way.

In the figures below, the representations are not necessarily to scale.

FIG. 1 is a schematic elevation view of an installation for manufacturing a fibrous mat, comprising an oven according to the invention;

FIG. 2 is a schematic sectional view along II of FIG. 1;

FIG. 3 shows a pallet of the lower conveyor of the oven of FIG. 1 integrating a measurement system according to the invention, the pallet carrying a sensor, a mechanical transmission system and a finger according to the invention;

FIG. 4 shows the pallet of FIG. 3 and the associated actuation system, in the vicinity of the start-of-measurement abscissa, FIG. 5 is an enlarged view of a detail of FIG. 4;

FIG. 6 is a partial perspective view of the measurement system of FIG. 4;

FIG. 7 is a partial perspective view of the measurement system of the preceding figures, in the vicinity of the end-of-measurement abscissa.

FIG. 1 schematically shows an installation 1 for producing fibrous product based on glass wool. This installation 1 comprises a fiberizing unit 11 to which molten glass is brought, in the usual way, from a furnace. The installation 1 comprises binder applicators 12 designed to deposit, in particular by spraying, a binder onto the fiber mat 13 produced by the fiberizing unit 11. The fibers are collected on a perforated conveyor 14, in the form of a mat 15 of glass wool fibers mixed with the binder. The binder may be a thermosetting resin, or any other type of suitable binder.

At the end of the conveyor 14, the installation 1 comprises a crosslinking oven 2 surrounded by an enclosure 3 that is closed (except around the mat at the inlet and at the outlet) delimiting, at the inlet 2a, an inlet port 20a and at the outlet 2b, an outlet port 20b, and between the inlet and outlet ports 20a, 20b, a series of boxes separated from one another by walls (not shown) and connected to one or more feed ducts 21 for the introduction of hot gases for curing the mat, and one or more exhaust ducts 22 for the discharge of the fumes resulting from the curing of the mat, in particular of the vaporization of the water contained in the mat. Two conveyors 4, 5 for transporting and calibrating the mat 15 pass through the enclosure 3. This involves a lower conveyor 4 and an upper conveyor 5 facing one another. The distance between the conveyors 4, 5 is adjustable, so as to calibrate the thickness of the mat 15.

Each of these conveyors 4, 5 forms an endless conveyor belt. Each comprises, in a conventional manner, a plurality of pallets 6 articulated to one another and perforated so as to be permeable to gases, driven around input rollers, respectively 25, 27 and outlet rollers 26, 28. More generally, however, each conveyor can be formed by any conveying element that is permeable to gases and forms an endless belt.

While ensuring the passage of hot gases that promote the rapid setting of the binder, the conveyors 4, 5 compress the mat 15 to the desired thickness.

For the rest of the present description, the direction X of the oven 2 is defined as corresponding to the forward direction of the mat 15 inside the oven, Y is the transverse direction of the oven 2 which corresponds to the direction of the thickness of the mat 15 and is therefore orthogonal to the useful surface 4a, 5a of each conveyor (that is, surface in contact with the mat), and lastly Z is the lateral direction, orthogonal to the directions X and Y.

FIG. 2 is a partial view of the oven 2 in lateral section: the mat 15 is compressed between the useful surfaces 4a, 5a of the lower and upper conveyors 4, 5, each useful surface 4a, 5a being here formed by the juxtaposition of the useful surfaces 6a of a plurality of pallets 6 of the conveyor concerned.

The lateral sides 4c, 4d of the lower conveyor are formed respectively by the juxtaposition of the lateral sides 6c, 6d of a plurality of pallets 6. The same applies to the lateral sides 5c, 5d of the upper conveyor.

Typically, as shown in FIG. 2, the hot air blowing module 23 is located directly under the useful side of the lower conveyor 4 and the suction module 24, directly above the useful side of the upper conveyor 5.

As shown in the FIG. 2 on the right, the pallets 6 of the conveyors 4 and 5 are associated with support means, positioned inside the oven 2, which guide their movement. For each pallet 6, the support means comprise a chain 18 wound around wheels (not shown) and connected to a lateral tongue 7 of the pallet 6, as shown in FIG. 2.

FIG. 2 shows a pallet 6 of the lower conveyor 4, integrating elements of a measurement system 30 according to the invention. As shown in the figure, the measurement system 30 is at least partly located on the lateral side 4c of the lower conveyor 4.

FIG. 3 shows in more detail the same pallet 6, as well as the measurement system 30.

Although the measurement system 30 is associated, in the embodiment shown, with the lower conveyor 4 of the oven 2, it is obviously quite possible to transpose the arrangement described to the upper conveyor 5.

The measurement system 30 comprises a measuring apparatus 32 provided with at least one sensor 34 arranged, in the example, at the distal end 36a of a longitudinal probe 36 extending in the transverse direction Y (that is, orthogonally to the plane of the useful surface 6a of the pallet 6). The probe is adapted to move through a through orifice (not visible) of the useful surface 6a. The sensor 34 can thus be moved between a retracted position wherein it is located below the useful surface 6a (the "top" here being defined in the direction of the mat) and a measurement position wherein the sensor 34 protrudes into the mat 15. The sensor 34 is preferably located toward the center of the pallet 6, in the lateral direction Z. It is advantageously located midway between the lateral sides 4c, 4d.

In the example, the sensor 34 is a temperature sensor, advantageously using a type of technology called SAW (Surface Acoustic Wave) technology. In other embodiments, the sensor could be a moisture or other sensor.

As a variant, the measurement system 30 may comprise a plurality of sensors 34 arranged on the same pallet or on different pallets.

In the example, the sensor 34 is connected by wires (not shown) to an antenna 38 mounted on the pallet 6, perpendicular to the sensor 34. This antenna 38 (hereinafter onboard antenna) is connected by a wireless connection to another antenna (not shown) forming an interrogation unit of the measuring device (hereinafter fixed antenna) and secured to the frame of the oven. The fixed antenna is connected to an electronic box for processing the signal and sending the data to a computer, another user interface, or any suitable member. According to an advantageous provision, the measurement system 30 is thus connected to a control member of the curing method, adapted to optimize the curing of the product as a function of the measurement carried out by the sensor. As a variant, the antenna 38 can be mounted fixed on the longitudinal probe 36.

SAW-type technology has the advantage of being wireless and operates in the following manner: an electromagnetic wave is transmitted by the fixed antenna to the on-board antenna 38. The electromagnetic wave is transformed into an acoustic wave. The temperature of the medium wherein the sensor 34 is located (temperature inside the mat 15) influences the physical properties of the acoustic wave being propagated at the surface of the sensor 34. In return, the modified wave is transformed into an electromagnetic wave to be sent back to the fixed antenna. The electronic box to which the fixed antenna is connected then processes the signal and sends it to the outside.

According to the invention, the sensor 34 is connected by a mechanical transmission system 40 to a finger 54 projecting from a lateral side of the first conveyor 4, here the lateral side 4c. Thus, any movement of the finger 54 causes the sensor 34 to move.

The measurement system 30 also comprises an actuation system 60 comprising at least one contact surface intended to cooperate with the finger 54 when moving in the forward direction X to move the sensor 34 between its retracted position and its measurement position inside the mat 15 via the mechanical transmission system 40.

The mechanical transmission system 40 and the actuation system 60 are described in more detail below:

The transmission system 40, generally defined in a lateral plane of the oven 2 (a plane orthogonal to the axis X) as shown in FIG. 3, comprises, in the example, a pivoting transmission lever 44 and a transmission arm in the form of a rod 46 (hereinafter transmission rod).

The probe 36 of the sensor 34 is mounted slidably in the transverse direction Y, and its proximal end 36b is pivotally mounted relative to the transmission lever 44 (hereinafter lever) about an axis A1, the lever 44 itself being mounted pivoting relative to the pallet 6 about a main axis O extending in the forward direction X.

The lever 44 thus pivots about the axis O, in a lateral plane of the oven 2.

The axes O and A1 are parallel to one another and are included in a plane substantially orthogonal to the transverse direction Y. Thus, when the lever 44 pivots, the axis A1 rises or descends, sliding the sensor 34 in the transverse direction Y from its measuring position to its retracted position or vice versa.

The lever 44 is also connected about an axis A2 to the transmission rod 46 which extends in the lateral direction Z.

The axes O and A2 are parallel to one another and to the forward direction X and are included in a plane substantially orthogonal to the lateral direction Z. Thus, when the lever 44 pivots, the axis A2 moves laterally, moving the rod 46 in the same lateral direction Z.

Moreover, as shown in FIG. 2, the transmission rod 46 is associated with a return spring 48, which biases it, at rest, toward the lateral side 4c of the pallet 6 (that is, away from the sensor 34).

At its end, the transmission rod 46 is terminated by a fork 50 bearing a shaft (not visible), forming the axis of rotation for a roller or wheel 54 constituting the finger of the measurement system 30. The axis of rotation extends in the transverse direction Y.

It is understood that the lever 44 and the transmission rod 46 connect the movements of the roller 54 and of the sensor 34 as follows: under the effect of the return force of the spring 48, the roller 54, by default, is in a first position furthest from the pallet 6. In this position, the sensor 34 is in its retracted position. If the roller 54 is moved against the force of the spring 48 to a second predetermined position, the transmission rod 46 is moved laterally and the lever 44 is rotated about its axis O, at the same time driving the sensor 34 to its measurement position.

The measurement system 30 is generally configured so that the sensor 34 is deployed in its measuring position in the vicinity of the inlet of the oven 2, then retracted in the vicinity of the oven outlet 2. In this way, measurements can be carried out at a point of the mat 15 throughout the path of said point inside the oven.

To facilitate the following explanations, the abscissa of each element or zone along the X-axis is defined below, oriented from the inlet to the outlet of the oven.

For example, the abscissa XO is defined as the abscissa for which the surface of the conveyors 4, 5 becomes flat at the end of the belt in the vicinity of the input rollers 25, 27, and the abscissa XF as the one up to which the surface of the conveyors 4, 5 is flat at the end of the belt in the vicinity of the exit rollers 26, 28.

The contact surface 64 is arranged at a fixed position relative to the frame of the oven and predetermined along the axis X. X1 is the start-of-measurement abscissa for which the sensor 34 arrives in its measurement position inside the mat 15 and X2 is the end-of-measurement abscissa for which the sensor 34 is extracted from the mat 15.

Preferably, the distance XO-X1 is less than 2 meters

Preferably, the distance X2-XF (as absolute value) is less than 2 meters

The distance X1-X2 depends entirely on the length of the oven and the nature of the desired measurement. If the measurement must be as long as possible in order to determine the temperature profile during the entire curing, then this distance will be chosen as long as possible.

The actuation system 60, shown in FIGS. 4 to 7, comprises a contact element 62 arranged in the vicinity of the inlet of the oven 2, secured to the frame of the oven, and a surface 64 of which, arranged facing the lateral side 4c of the conveyor 4 carrying the measurement system (here the lower conveyor), forms the contact surface intended to cooperate with the roller 54.

The contact surface 64, better visible in FIG. 6, forms a deployment ramp 66 inclined relative to the directions X and Z, preferably a flat ramp defined in a plane parallel to the transverse direction Y. As the abscissa increases, the deployment ramp 66 moves closer to the lateral side 4c of the conveyor 4.

The deployment ramp 66 is advantageously extended by a bearing 68, preferably a flat bearing defined in a plane orthogonal to the lateral direction Z.

By moving in the forward direction X, the finger 54 comes into contact with the ramp 66. Under the effect of the pushing force, greater than the return force of the spring 48, the finger 54 is gradually driven towards the conveyor 4. Once in contact with the bearing 68 (abscissa X1), the roller 54 has reached its second position wherein the sensor 34 is in its deployed position.

The positioning of the bearing 68 in the lateral direction Z thus conditions the measurement depth of the sensor 34. Due to the fixed length of the transmission rod 46, the closer the bearing 68 is to the conveyor 4, the higher the measurement position will be, and vice versa.

In the embodiment considered, the contact element 62 extends over a limited length at the inlet of the oven. It typically has a length, measured in the forward direction, of less than 1 meter.

To prevent the roller 54, upon leaving the contact element 62, from returning to its first position under the effect of the elastic return induced by the spring 48, the actuation system 60 is provided with a system 70 for locking the finger 54 in lateral position, visible in FIG. 5.

In the example, this system 70 comprises a ratchet 72 pivotally mounted relative to the pallet 6, about an axis A3 extending in the forward direction X and provided with at least one stop tooth 74. The pawl 72 is elastically biased, by a spring 75, in a locking position wherein the tooth 74 cooperates with one of a plurality of complementary retaining elements integral to the finger, distributed in the lateral direction Z, and corresponding respectively to a plurality of predetermined lateral locking positions for the finger 54. In the example, the complementary retaining elements are a plurality of notches 51, carried by the fork 50 for supporting the roller 54.

To allow the engagement of the roller 54 with the ramp 66, it is obviously necessary to deactivate the locking system 70 upstream of the contact element 62.

For this purpose, the actuation system comprises means for unlocking the pawl making it possible to pivot the pawl until disengaging the tooth 74 from the notches 51. These unlocking means comprise a deactivation ramp 76, visible in FIG. 6, integral with the frame, generally defined in a plane inclined with respect to the forward direction X and the transverse direction Y and parallel to the lateral direction Z. The deactivation ramp 76 is at least partially juxtaposed with the contact element 62 and adapted to cooperate with the distal end 72a of the pawl 72 so as to pivot the pawl 72 about its axis A3 and disengage the tooth 74, upstream and in line with the contact element 62, until in line with the bearing 68.

The dimensions of the deactivation ramp 76 are chosen so that contact with the pawl 72 is broken once the roller has arrived on the bearing 68.

On leaving the deactivation ramp 76, the pawl 72 is immediately returned to its locking position by the spring 75. By cooperation of the tooth 74 with a notch 51 of the fork 50, the roller 54 is held in its second position, determined by the lateral positioning of the bearing 68.

For cases where the tooth 74 would not face a notch at the moment of deactivation, the contact surface 64 can be extended downstream of the bearing 68 by a descending safety ramp (as opposed to the upward deployment ramp 66) serving to allow progressive locking between the tooth 74 and one of the adjacent notches 51 and to avoid a sudden return of the finger 54 to its first position.

As shown in FIG. 7, in the vicinity of the outlet of the oven 2, and to ensure the return of the sensor 34 to its retracted position under the effect of the elastic return of the spring 48, the actuation system 40 comprises a second deactivation ramp 78, also secured to the frame, adapted to raise the pawl to disengage the tooth 74 from the notches 51.

As previously indicated, the height of the upper conveyor 5 is generally set at each start of the line, and during a change of product. For the temperature measurement inside the mat 15 to be as close as possible, it is preferable to measure at the core of the mat, that is, preferably halfway between the first and second conveyors 4, 5. Advantageously, the measurement system 30 is provided with a system 80 for adjusting the measurement position of the sensor 34 as a function of the position of the upper conveyor 5. More specifically, this adjustment system 80 comprises means for adjusting the position of the contact element 62 in the lateral direction Z, based on the position of the second conveyor 5 and in particular on its height relative to the lower conveyor 4, in the transverse direction Y.

In the shown example and as can be seen in FIG. 4 in particular, the contact element 62 is secured to a connecting arm 82 mounted slidably in the lateral direction Z inside a guide 84. The connecting arm 82 is also secured to a sliding element 86 in the form of a lug, mounted slidably along a rail 88 here formed by an elongate opening formed in the thickness of a vertical profile 90. The profile 90 and the rail 88 extend generally in the transverse direction Y and are secured to the upper conveyor 5. As shown in the figure, the rail 88 is inclined relative to the transverse direction Y and to the lateral direction Z so that a transverse movement of the second conveyor 5 causes a lateral movement of the sliding element 86 and therefore of the contact surface 64 that is integral therewith.

The adjustment is done as follows: in FIG. 4, the measurement position is at its maximum. When the upper conveyor 5 is lowered to reduce the thickness of the mat 15, the profile 90 and the rail 88 are also moved downward. When the lug 86 penetrates the inclined part of the rail 88, it is gradually moved laterally away from the lower conveyor 4, conjointly moving the bearing 68 of the contact element 62 and thus lowering the measurement position of the sensor 34.

By virtue of the plurality of retaining elements (here notches) 51 arranged on the fork 50, the pawl 72 can lock the position of the roller 54 in a plurality of different (second) positions, corresponding to different measurement heights.

The embodiment shown and described above is not limiting to the invention, and numerous variants are obviously conceivable. For example, according to an alternative embodiment not shown, the contact surface could form a ramp extended by a bearing extending continuously up to the end-of-measurement abscissa X2. The contact surface can then extend over a substantial length of the oven, for example a length of at least 10 meters. In particular, provision could be made to provide a bearing extending from the vicinity of the inlet of the oven to the vicinity of the outlet of the oven.

In this case, the sensor position being held by the cooperation of the roller with the bearing of the contact element, position locking and unlocking means can be omitted.

The invention claimed is:

1. An oven for heating a fibrous mat, said oven comprising a first conveyor for transporting the mat in a forward direction, and a measurement system inside the fibrous mat, said measurement system comprising a sensor mounted on said first conveyor and adapted to move in a transverse direction between a retracted position inside the first conveyor and a measurement position inside the fibrous mat under the effect of an actuation system, the measurement system being such that the sensor is connected by a mechanical transmission system to a finger projecting from a lateral side of the first conveyor, and the actuation system comprises at least one contact surface located facing said lateral side of the first conveyor and adapted to cooperate with said finger in its movement in the forward direction in order to move the sensor from its retracted position to its measuring position by the mechanical transmission system.

2. The oven according to claim 1, wherein the mechanical transmission system comprises a transmission arm extending laterally and a pivotable lever connected to said arm and to said sensor such that a lateral movement of the transmission arm generates a transverse movement of the sensor.

3. The oven according to claim 1, wherein the finger is a rotary roller.

4. The oven according to claim 1, wherein the measurement system further comprises a system for adjusting the measurement position of the sensor as a function of the position of a second conveyor facing said first conveyor in the transverse direction.

5. The oven according to claim 4, wherein the position adjustment system comprises means for adjusting the position of the contact surface in the lateral direction, depending on the position of the second conveyor.

6. The oven according to claim 5, wherein the contact surface is integral with a sliding element, mounted slidably along a rail integral with the second conveyor and whose inclination with respect to the transverse direction and to the lateral direction is such that a transverse movement of the second conveyor causes a lateral movement of the sliding element and therefore of the contact surface.

7. The oven according to claim 1, wherein the finger is elastically returned away from the first conveyor, in a position wherein the sensor is in its retracted position.

8. The oven according to claim 1, wherein the contact surface forms at least one deployment ramp.

9. The oven according to claim 8, wherein the ramp is extended by a bearing.

10. The oven according to claim 9, wherein the bearing extends continuously to the end-of-measurement abscissa.

11. The oven according to claim 8, wherein the measurement system is configured such that the sensor is deployed in its measurement position in an abscissa called the start-of-measurement in the forward direction, and such that the sensor is returned to its retracted position in an abscissa called the end-of-measurement in the forward direction.

12. The oven according to claim 8, wherein the actuation system is configured so that the contact between the finger and the contact surface is broken upstream from the end-of-measurement abscissa.

13. The oven according to claim 8, wherein the contact surface has a length, measured in the forward direction, of less than 1 meter.

14. The oven according to claim 1, wherein the actuation system further comprises a system for locking the finger in lateral position.

15. The oven according to claim 14, wherein the position locking system comprises a rotary pawl provided with at least one stop tooth and biased by elastic return means in a locking position wherein said at least one stop tooth is adapted to cooperate with complementary retaining means carried by the finger or a support element of the finger, and the actuation system comprises means for unlocking the pawl making it possible to pivot the pawl against the elastic return means, in a disengaged position wherein the tooth is disengaged from said complementary retaining means.

16. The oven according to claim 15, wherein the unlocking means comprise at least one first deactivation ramp arranged to cooperate with the pawl perpendicular to the contact surface.

17. The oven according to claim 15, wherein the unlocking means comprise a second deactivation ramp spaced from the first deactivation ramp, in the forward direction.

18. The oven according to claim 1, wherein at least the first conveyor is formed of a plurality of pallets consisting of screens articulated together and perforated.

19. The oven according to claim 1, wherein the sensor is a temperature sensor.

20. The oven according to claim 1, wherein the fibrous mat is a mat comprising mineral or plant fibers bound by a binder.

* * * * *